United States Patent
Yamaguchi et al.

(10) Patent No.: US 11,384,271 B2
(45) Date of Patent: Jul. 12, 2022

(54) REFRIGERATOR, REFRIGERATOR OIL, WORKING FLUID COMPOSITION FOR REFRIGERATOR

(71) Applicant: ENEOS Corporation, Tokyo (JP)

(72) Inventors: Kentaro Yamaguchi, Tokyo (JP); Yuya Mizutani, Tokyo (JP); Satoshi Nagai, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/981,388

(22) PCT Filed: Apr. 2, 2019

(86) PCT No.: PCT/JP2019/014675
§ 371 (c)(1),
(2) Date: Sep. 16, 2020

(87) PCT Pub. No.: WO2019/194195
PCT Pub. Date: Oct. 10, 2019

(65) Prior Publication Data
US 2021/0009884 A1 Jan. 14, 2021

(30) Foreign Application Priority Data
Apr. 2, 2018 (JP) .............................. JP2018-071059

(51) Int. Cl.
| | |
|---|---|
| *C09K 5/04* | (2006.01) |
| *C10M 171/00* | (2006.01) |
| *F25B 1/00* | (2006.01) |
| *C10N 20/00* | (2006.01) |
| *C10N 20/02* | (2006.01) |
| *C10N 40/30* | (2006.01) |

(52) U.S. Cl.
CPC ......... *C09K 5/044* (2013.01); *C10M 171/008* (2013.01); *F25B 1/00* (2013.01); *C09K 2205/122* (2013.01); *C10N 2020/02* (2013.01); *C10N 2020/101* (2020.05); *C10N 2040/30* (2013.01)

(58) Field of Classification Search
CPC .... C09K 5/044; C09K 2205/122; C09K 5/04; C09K 2205/12201; C10M 171/008; C10M 2203/003; C10M 2203/065; C10M 2203/1025; C10M 2207/2835; C10M 2215/223; C10M 2207/026; C10M 2207/044; C10M 171/02; C10M 2203/06501; C10M 2215/22301; F25B 1/00; F25B 9/008; F25B 2400/121; F25B 2500/16; F25B 1/0001; C10N 2020/101; C10N 2020/02; C10N 2040/30; C10N 2030/02; C10N 2020/097
USPC .................... 252/68; 508/110, 577
See application file for complete search history.

(56) References Cited

U.S. PATENT DOCUMENTS

| | | | |
|---|---|---|---|
| 5,716,916 A | 2/1998 | Shiokawa et al. | |
| 6,190,574 B1* | 2/2001 | Nakagawa | C10M 169/04 252/68 |
| 9,676,983 B2* | 6/2017 | Saito | C09K 5/045 |
| 9,834,737 B2 | 12/2017 | Takahashi et al. | |
| 10,023,823 B2* | 7/2018 | Takahashi | C10M 171/008 |
| 10,323,208 B2* | 6/2019 | Takahashi | C09K 5/04 |
| 10,513,666 B2* | 12/2019 | Takahashi | C10M 171/008 |
| 2004/0157753 A1 | 8/2004 | Tazaki et al. | |
| 2004/0167042 A1 | 8/2004 | Yamazaki et al. | |
| 2010/0093568 A1* | 4/2010 | Tagawa | C10M 169/04 508/133 |
| 2015/0344760 A1* | 12/2015 | Saito | C10M 171/008 252/68 |
| 2016/0244692 A1* | 8/2016 | Takahashi | C10M 133/16 |
| 2016/0355719 A1 | 12/2016 | Fukushima et al. | |
| 2017/0327759 A1* | 11/2017 | Takahashi | C10M 105/38 |
| 2017/0327765 A1* | 11/2017 | Takahashi | C09K 5/04 |
| 2018/0037836 A1* | 2/2018 | Takahashi | C10M 171/008 |
| 2018/0037856 A1* | 2/2018 | Keuleers | C11D 17/042 |
| 2018/0044607 A1* | 2/2018 | Tada | C10M 169/04 |
| 2019/0078005 A1* | 3/2019 | Shono | C09K 5/044 |
| 2020/0199476 A1* | 6/2020 | Yamaguchi | C09K 5/08 |
| 2020/0308504 A1* | 10/2020 | Nara | C10M 171/008 |
| 2020/0354645 A1* | 11/2020 | Shono | C10M 137/105 |
| 2020/0369979 A1* | 11/2020 | Nara | C10M 171/02 |
| 2021/0054301 A1* | 2/2021 | Shono | C10M 131/04 |

FOREIGN PATENT DOCUMENTS

| | | |
|---|---|---|
| CN | 1168409 | 12/1997 |
| CN | 1300316 | 6/2001 |
| CN | 104837966 | 8/2015 |
| CN | 105473953 | 4/2016 |
| CN | 107044739 | 8/2017 |
| CN | 107663467 A | 2/2018 |
| CN | 107849475 | 3/2018 |
| EP | 0801129 | 10/1997 |
| EP | 1085077 | 3/2001 |
| JP | H10-030095 | 2/1998 |

(Continued)

OTHER PUBLICATIONS

ISR issued in WIPO Patent Application No. PCT/JP2019/014675, dated Jun. 18, 2019, English translation.

(Continued)

*Primary Examiner* — Douglas J McGinty
(74) *Attorney, Agent, or Firm* — Greenblum & Bernstein, P.L.C.

(57) ABSTRACT

One aspect of the present invention is a refrigerating machine including a refrigerant circulation system including a compressor, a condenser, an expansion mechanism, and an evaporator, and the refrigerant circulation system being filled with a refrigerant and a refrigerating machine oil, wherein the refrigerating machine oil contains: a first base oil having a compatible region with the refrigerant in a range of a temperature of 30° C. or lower and an oil ratio of 1 to 80% by mass; and a second base oil having a kinematic viscosity at 40° C. lower than the first base oil and having a narrower compatible region with the refrigerant than the first base oil.

19 Claims, 2 Drawing Sheets

(56) References Cited

FOREIGN PATENT DOCUMENTS

| | | | |
|---|---|---|---|
| JP | 2002-038176 A | 2/2002 | |
| JP | 2002-060770 A | 2/2002 | |
| JP | 2002-060771 A | 2/2002 | |
| JP | 2002-105471 A | 4/2002 | |
| TW | I252250 B | 4/2006 | |
| TW | I617658 B | 3/2018 | |
| WO | 01/096505 A1 | 12/2001 | |
| WO | 2014/087916 A1 | 6/2014 | |
| WO | 2015/033653 | 3/2015 | |
| WO | WO-2016056392 A1 * | 4/2016 | .......... C10M 105/40 |
| WO | WO-2016079857 A1 * | 5/2016 | .......... G06F 3/03547 |
| WO | WO-2016140040 A1 * | 9/2016 | .......... C10M 129/16 |
| WO | WO-2016140187 A1 * | 9/2016 | ............. C09K 5/045 |

OTHER PUBLICATIONS

IPRP issued in WIPO Patent Application No. PCT/JP2019/014675, dated Oct. 15, 2020, English translation.
EESR issued in EP Patent Application No. 19780637.5, Aug. 4, 2021.

* cited by examiner

REFRIGERATOR, REFRIGERATOR OIL, WORKING FLUID COMPOSITION FOR REFRIGERATOR

TECHNICAL FIELD

The present invention relates to a refrigerating machine, a refrigerating machine oil, and a working fluid composition for a refrigerating machine.

BACKGROUND ART

The refrigerating machine includes a refrigerant circulation system having a compressor, a condenser, an expansion mechanism, an evaporator, and the like. In the refrigerant circulation system, a phenomenon of taking heat from the surroundings when a liquid is vaporized is utilized, and a cycle including compression and temperature rise of the vaporized refrigerant in a compressor, liquefaction of the refrigerant by heat radiation and condensation in a condenser, decompression and expansion in an expansion mechanism, and vaporization of the refrigerant in an evaporator is repeated.

In addition to the refrigerant, the refrigerant circulation system is filled with lubricating oil (refrigerating machine oil) for lubricating sliding portions of the compressor. The refrigerating machine oil is designed so as to obtain desired performance when filled in the refrigerant circulation system, and at this time, it is important to consider compatibility with the refrigerant. For example, the refrigerating machine oil having poor compatibility with the refrigerant is not compatible with the refrigerant when circulating in the refrigerant circulation system, and thus may not return to the sliding portion of the compressor. As a result, there is a concern about deterioration of lubricity.

In contrast, for example, Patent Literature 1 discloses a compressor in which a liquid mixture of a refrigerating machine oil and a refrigerant is separated into two layers at a refrigerating machine oil content of 10 to 40% by mass and a temperature range of −40° C. to 60° C., and is compatible at a refrigerating machine oil content of 5% by mass or less, a temperature range of 20° C. to 40° C., and a refrigerating machine oil content of 55% by mass or more and a temperature range of 20° C. to 50° C.

CITATION LIST

Patent Literature

[Patent Literature 1] International Publication No. 2015/033653

SUMMARY OF INVENTION

Technical Problem

On the other hand, as one of means for improving the efficiency of a refrigerating machine, there is reduction in viscosity of a refrigerating machine oil (particularly, reduction in viscosity at a low temperature (for example, 0° C. or lower)). However, since a low-viscosity base oil used for reducing the viscosity of the refrigerating machine oil generally tends to have good refrigerant compatibility, when the viscosity of the refrigerating machine oil is reduced, the viscosity of the refrigerant dissolved in the refrigerating machine oil (refrigerant dissolved viscosity) tends to be reduced. When the refrigerant dissolved viscosity decreases, it becomes difficult to hold the oil film in the sliding portion, the lubricity is impaired, and the efficiency of the refrigerating machine may be deteriorated. That is, it is not always easy to improve the efficiency of the refrigerating machine while suppressing the reduction of the lubricity in the sliding portion.

Therefore, an object of the present invention is to improve the efficiency of a refrigerating machine while suppressing a decrease in lubricity in a sliding portion.

Solution to Problem

One aspect of the present invention is a refrigerating machine comprising a refrigerant circulation system comprising a compressor, a condenser, an expansion mechanism, and an evaporator, and the refrigerant circulation system being filled with a refrigerant and a refrigerating machine oil, wherein the refrigerating machine oil comprises: a first base oil having a compatible region with the refrigerant in a range of a temperature of 30° C. or lower and an oil ratio of 1 to 80% by mass; and a second base oil having a kinematic viscosity at 40° C. lower than the first base oil and having a narrower compatible region with the refrigerant than the first base oil.

In this refrigerating machine, as the refrigerating machine oil filled in the refrigerant circulation system, a refrigerating machine oil containing a first base oil having a compatible region with the refrigerant in a range of a temperature of 30° C. or lower and an oil ratio of 1 to 80% by mass and a second base oil having a kinematic viscosity at 40° C. lower than the first base oil and having a compatible region narrower than the first base oil is used. The first base oil has a compatible region with the refrigerant in a range of a temperature of 30° C. or lower and an oil ratio of 1 to 80% by mass, and thus exhibits good compatibility with the refrigerant. On the other hand, the second base oil has a compatible region narrower than the first base oil, and thus has low compatibility with the refrigerant.

Since the refrigerating machine oil contains the first base oil and the second base oil, the refrigerating machine oil has a certain refrigerant compatibility, and can achieve a low viscosity while maintaining the refrigerant dissolved viscosity. That is, a decrease in the refrigerant dissolved viscosity under high-temperature and high-pressure conditions is suppressed, so that the oil film in the sliding portion is maintained, and as a result, a decrease in the lubricity in the sliding portion can be suppressed. In addition, since the second base oil has a kinematic viscosity at 40° C. lower than the first base oil, the viscosity of the refrigerating machine oil is reduced, and the viscosity of the working fluid is reduced, thereby improving the efficiency of the refrigerating machine. In addition, particularly when the viscosity of the refrigerating machine oil is reduced at a low temperature, the retention of the oil in the evaporators or the evaporation pipes is suppressed, and as a result, the efficiency of the refrigerating machine is further improved. Therefore, in this refrigerating machine, it is possible to improve the efficiency of the refrigerating machine while suppressing a decrease in lubricity in the sliding portion. Further, even under a low temperature such as in a cold district or in winter, the low-temperature startability is improved and the efficiency of the refrigerating machine is improved because the refrigerating machine oil has a low viscosity.

The first base oil may have a compatible region with the refrigerant in a range of a temperature of 30° C. or lower and an oil ratio of 1 to 5% by mass or 50 to 80% by mass.

The second base oil may have no compatible region with the refrigerant in a range of 30° C. or lower and an oil ratio of 10 to 40% by mass.

The refrigerating machine oil may have no compatible region with the refrigerant in a range of a temperature of 30° C. or lower and an oil ratio of 10 to 40% by mass, and may have a compatible region in a range of a temperature of 30° C. or lower and an oil ratio of 1 to 5% by mass or 50 to 80% by mass. A kinematic viscosity at −20° C. of the refrigerating machine oil may be lower than the kinematic viscosity at −20° C. of the first base oil.

The refrigerant may contain difluoromethane.

The second base oil may have a kinematic viscosity at 40° C. of 10 to 60 mm$^2$/s and a viscosity index of 120 or more.

The content of the second base oil may be 3% by mass or more and 60% by mass or less based on the total amount of the base oil.

Another aspect of the present invention is a refrigerating machine oil for use with a refrigerant, the refrigerating machine oil containing a first base oil having a compatible region with the refrigerant in a range of a temperature of 30° C. or lower and an oil ratio of 1 to 80% by mass, and a second base oil having a kinematic viscosity at 40° C. lower than the first base oil and having a compatible region narrower than the first base oil.

Another aspect of the present invention is a working fluid composition for a refrigerating machine comprising a refrigerating machine oil and a refrigerant, wherein the refrigerating machine oil comprises a first base oil having a compatible region with the refrigerant in a range of a temperature of 30° C. or lower and an oil ratio of 1 to 80% by mass, and a second base oil having a kinematic viscosity at 40° C. lower than the first base oil and a compatible region narrower than the first base oil.

Another aspect of the present invention is a method of producing a refrigerating machine oil for use with a refrigerant, comprising selecting a first base oil and a second oil, and mixing the first base oil and the second base oil, wherein the first base oil has a compatible region in a range of a temperature of 30° C. or lower and an oil ratio of 1 to 80% by mass and the second base oil has a kinematic viscosity at 40° C. lower than the first base oil and a compatible region narrower than the first base oil.

Advantageous Effects of Invention

According to the present invention, it is possible to improve the efficiency of a refrigerating machine while suppressing a decrease in lubricity in a sliding portion.

DESCRIPTION OF EMBODIMENTS

Hereinafter, embodiments of the present invention will be described in detail with reference to the Figures as appropriate.

Figure 1:
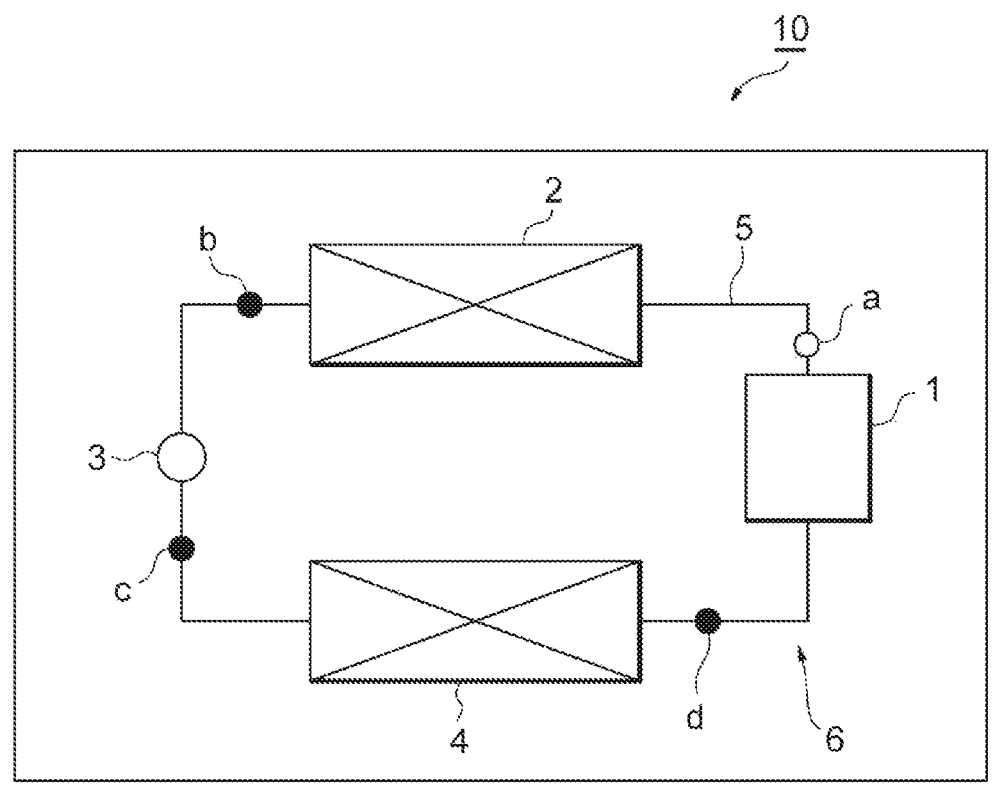
FIG. 1 is a schematic diagram showing an embodiment of a refrigerating machine.

FIG. 1 is a schematic diagram showing an embodiment of the refrigerating machine. As shown in FIG. 1, the refrigerating machine 10 includes at least a refrigerant circulation system 6 in which a compressor (refrigerant compressor) 1, a condenser (gas cooler) 2, an expansion mechanism 3 (capillary, expansion valve, etc.), and an evaporator (heat exchanger) 4 are sequentially connected by a flow path 5.

In the refrigerant circulation system 6, first, a high-temperature (usually 70 to 120° C.) refrigerant discharged from the compressor 1 into the flow path 5 becomes a high-density fluid (supercritical fluid or the like) in the condenser 2. Subsequently, the refrigerant is liquefied by passing through a narrow flow path of the expansion mechanism 3, and is further vaporized in the evaporator 4 to have a low temperature (usually −40 to 0° C.). The cooling by the refrigerating machine 10 utilizes a phenomenon that the refrigerant takes heat from the surroundings when the refrigerant is vaporized in the evaporator 4.

In the compressor 1, a small amount of refrigerant and a large amount of refrigerating machine oil coexist under a high temperature condition (usually 70 to 120° C.). The refrigerant discharged from the compressor 1 to the flow path 5 is in a gaseous state and contains a small amount (usually 1 to 10% by volume) of refrigerating machine oil as mist. A small amount of refrigerant is dissolved in the mist-like refrigerating machine oil (point a in the FIG. 1).

In the condenser 2, the gaseous refrigerant is compressed into a high-density fluid, and a large amount of refrigerant and a small amount of refrigerating machine oil coexist under a relatively high temperature condition (usually 50 to 70° C.) (point b in the FIG. 1). Further, a mixture of a large amount of refrigerant and a small amount of refrigerating machine oil is sent to the expansion mechanism 3 and the evaporator 4 in this order to rapidly reach a low temperature (usually −40 to 0° C.) (points c and d in the FIG. 1), and is returned to the compressor 1 again.

Examples of the refrigerating machine 10 include an air conditioner for an automobile, a dehumidifier, a refrigerator, a freezing and refrigerating warehouse, a vending machine, a showcase, a cooling device in a chemical plant or the like, an air conditioner for a house, a package air conditioner, and a heat pump for hot water supply.

The refrigerant circulation system 6 is filled with a refrigerant. Examples of the refrigerant include a saturated hydrofluorocarbon (HFC) refrigerant, an unsaturated hydrofluorocarbon (HFO) refrigerant, a hydrocarbon refrigerant, a fluorine-containing ether-based refrigerant such as perfluoroethers, a bis(trifluoromethyl)sulfide refrigerant, a 3-fluoroiodomethane refrigerant, and a natural refrigerant such as ammonia (R717) and carbon dioxide (R744).

As the saturated hydrofluorocarbon refrigerant, a saturated hydrofluorocarbon having preferably 1 to 3 carbon atoms, more preferably 1 to 2 carbon atoms is used. The saturated hydrofluorocarbon refrigerant may be any one or a mixture of two or more of difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc).

As the mixture of saturated hydrofluorocarbon refrigerants, for example, R410A, R410B, R507C, R407C, R407E, R404A and the like are preferably used.

Examples of the unsaturated hydrofluorocarbon refrigerant include unsaturated hydrofluorocarbons having 2 to 4 carbon atoms (which may further have chlorine atom in the molecules), and specific examples thereof include fluoroethylene, fluoropropene, fluorobutene, and chlorofluoropropene. The unsaturated hydrofluorocarbon refrigerant is, for example, 1,1,2-trifluoroethylene (HFO-1123), 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), 3,3,3-trifluoropropene (HFO-1243zf), (Z)-1,1,1,4,4,4-hexafluoro-2-butene (HFO-1336mzz), cis or trans-1-chloro-1,3,3,3-trifluoropropene (1233zd(Z) or (E)), cis or trans-1-chloro-2,3,3,3-tetrafluoropropene (HCFO-1224yd(Z) or (E)), or a mixture of two or more thereof.

Examples of the hydrocarbon refrigerant include hydrocarbons having 1 to 5 carbon atoms. The hydrocarbon refrigerant may be, for example, any one or a mixture of two or more of methane, ethylene, ethane, propylene, propane (R290), cyclopropane, normal butane, isobutane, cyclobutane, methylcyclopropane, 2-methylbutane and normal pentane.

The refrigerant is preferably a refrigerant containing difluoromethane (R32), more preferably a mixed refrigerant containing difluoromethane (R32), and still more preferably a mixed refrigerant containing difluoromethane (R32) and pentafluoroethane (R125), from the viewpoint of easily obtaining high-temperature and high-pressure conditions of 80° C. or higher and 3.4 MPa or higher.

The refrigerant may further contain the above-described refrigerant in addition to difluoromethane or difluoromethane and pentafluoroethane. The refrigerant used with difluoromethane or difluoromethane and pentafluoroethane may preferably be 1,1,1,2-tetrafluoroethane (R134a), 2,3,3,3-tetrafluoropropene (HFO1234yf), 1,3,3,3-tetrafluoropropene (HFO1234ze(E) or (Z)), trifluoroethylene (HFO1123). The content of the refrigerant used with difluoromethane or difluoromethane and pentafluoroethane may be, for example, 80% by mass or less or 60% by mass or less, preferably 10% by mass or more, more preferably 20% by mass or more, or 40% by mass or more, based on the total amount of the refrigerant.

Among them, as the refrigerant, R32 mixed refrigerants containing 10% by mass or more of R32, such as an R32 mixed refrigerant having a mass ratio (R32/R125) of 50/50, an R32 mixed refrigerant (R407C) having a mass ratio (R32/R125/R134a) of 23/25/52, an R32 mixed refrigerant (R449A) having a mass ratio (R32/R125/HFO1234yf R134a) of 24.3/24.7/25.3/25.7, an R32 mixed refrigerant (R448A) having a mass ratio (R32/R125/HFO1234yf/R134a/HFO1234ze(E)) of 26/26/20/21/7, an R32 mixed refrigerant (R452B) having a mass ratio (R327/R125/HFO-1234yf) of 67/7/26, an R32 mixed refrigerant (R454B) having a mass ratio (R32/HFO-1234yf) of 69/31. an R32 mixed refrigerant (R447A) having a mass ratio (R32/R125/HFO-1234ze) of 68/3.5/28.5, an R32 mixed refrigerant (R447B) having a mass ratio (R32/R125/HFO-1234ze) of 68/8/24, an R32 mixed refrigerant (R446A) having a mass ratio (R32/HFO-1234ze/R600a) of 68/29/3, an R32 mixed refrigerant having a mass ratio (R32/HFO-1123) of 60 to 40/40 to 60, an R32 mixed refrigerant (R444A) having a mass ratio (R32/R152a/HFO-1234ze) of 12/5/83, an R32 mixed refrigerant (R455A) having a mass ratio (R32/HFO-1234yf/R744) of 21.5/75.5/3 are preferably used.

In one embodiment, the refrigerant more preferably consists of difluoromethane and pentafluoroethane. The mass ratio (R32/R125) of difluoromethane (R32) to pentafluoroethane (R125) in the refrigerant may be, for example, 40/60 to 70/30. As such a refrigerant, a refrigerant having a mass ratio (R32/R125) of 60/40, a refrigerant (R410A) having a mass ratio (R32/R125) of 50/50, and a refrigerant (R410B) having a mass ratio (R32/R125) of 45/55 are preferably used, and R410A is particularly preferably used.

The refrigerant circulation system 6 is filled with a refrigerating machine oil in addition to the refrigerant (that is, filled with a working fluid composition for a refrigerating machine containing the refrigerant and the refrigerating machine oil). The refrigerating machine oil contains a first base oil and a second base oil.

The first base oil is a base oil having a compatible region with the refrigerant (region in which the base oil is compatible with the refrigerant) in the range of a temperature of 30° C. or lower and an oil ratio of 1 to 80% by mass. In the present specification, "oil ratio" means the ratio (mass ratio) of the refrigerating machine oil to the total amount of the refrigerant and the refrigerating machine oil, "compatible" means that the refrigerant and the refrigerating machine oil are mutually dissolved without two layer separation, and "incompatible" means that the refrigerant and the refrigerating machine oil are separated into two layers.

Figure 2:
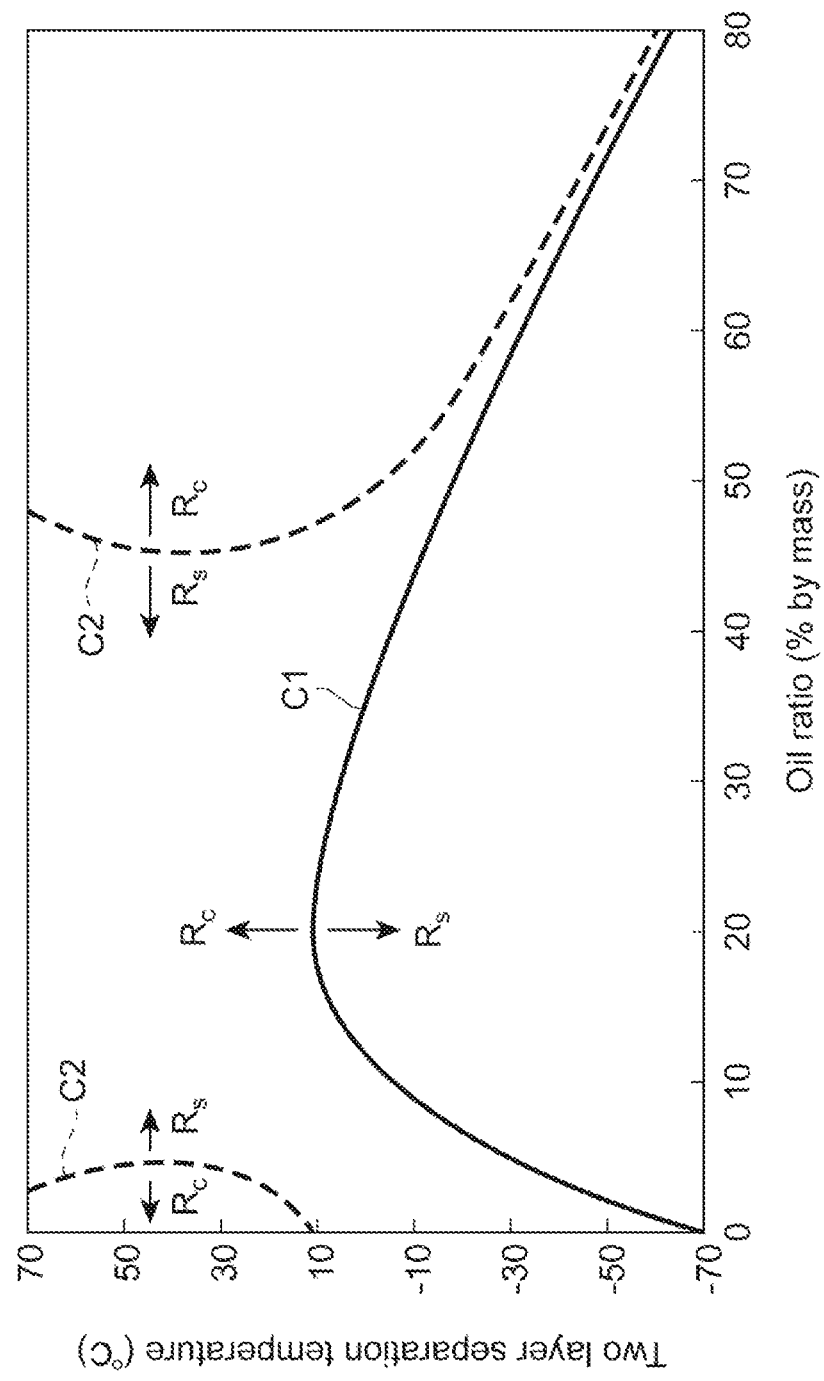
FIG. 2 is a graph showing an example of the relationship between the oil ratio and the two layer separation temperature.

FIG. 2 is a graph showing an example of the relationship between the oil ratio and the two layer separation temperature. The two layer separation curve means a curve drawn by plotting the two layer separation temperature at each oil ratio, where the horizontal axis represents the oil ratio and the vertical axis represents the two layer separation temperature (° C.) between the refrigerant and the refrigerating machine oil. The two layer separation temperature means a two layer separation temperature measured in accordance with "Compatibility test method with refrigerant" of JIS K2211:2009 "Refrigerating machine oil". Specifically, for example, the two layer separation temperature on the low temperature side is measured as a temperature at which a mixture obtained by mixing a refrigerant and a refrigerating machine oil at a predetermined oil ratio is gradually cooled from 30° C., and the mixture is subjected to two layer separation or becomes cloudy.

The two layer separation curve C1 indicated by the solid line in FIG. 2 is an example of the two layer separation curve of the first base oil. As shown in FIG. 2, the first base oil has an upward convex two layer separation curve C1 in which the two layer separation temperature increases as the oil ratio increases from 0% by mass, the two layer separation temperature reaches a maximum value at a predetermined oil ratio, and the two layer separation temperature decreases as the oil ratio further increases. Such a shape of the two layer separation curve C1 can be seen in a case where the above-described R32 containing mixed refrigerant, typically, for example, R410A is used as the refrigerant, and the below-described polyolester or polyvinyl ether is used as the first base oil.

In this case, the first base oil has a compatible region $R_C$ compatible with the refrigerant on the upper side of the two layer separation curve C1 (on the high temperature side of the two layer separation temperature) and a separation region (incompatible region) $R_S$ separated from the refrigerant on the lower side of the two layer separation curve C1 (on the low temperature side of the two layer separation temperature). The first base oil has a compatible region $R_C$ compatible with the refrigerant in the range of a temperature of 30° C. or lower and an oil ratio of 1 to 80% by mass, preferably at a temperature of 30° C. or lower and an oil ratio of 10 to 40% by mass, from the viewpoint of obtaining a refrigerating machine oil having suitable compatibility with the refrigerant. The first base oil is desirably a base oil having a low-temperature-side two layer separation curve of an upwardly convex shape at 30° C. or lower with respect to the R410A refrigerant.

In addition, in the case where, for example, the R32 refrigerant is used as the refrigerant, the two layer separation curve may exhibit the behavior as shown by the two layer separation curve C2 even if the first base oil described above is used. Such a behavior can be exhibited in the case where, for example, esters of pentaerythritol and fatty acids having an average carbon number of 8 or more are used. Even in this case, the first base oil has the compatible region $R_C$ compatible with the refrigerant in the range of a temperature of 30° C. or lower and an oil ratio of 1 to 80% by mass. There may be no compatible region $R_C$ that is compatible with the refrigerant in the range of a temperature of 30° C. or lower and an oil ratio of 10 to 40% by mass (only the separation region $R_S$ that separates from the refrigerant), but there is a compatible region $R_C$ that is compatible with the refrigerant at least in the range of a temperature of 30° C. or lower and an oil ratio of 1 to 5% by mass or 50 to 80% by mass.

The kinematic viscosity at 40° C. of the first base oil may be, for example, 40 mm$^2$/s or more, 50 mm$^2$/s or more, or 60 mm$^2$/s or more, and may be 500 mm$^2$/s or less, 200 mm$^2$/s or less, or 100 mm$^2$/s or less. The kinematic viscosity at 100° C. of the first base oil may be, for example, 1 mm$^2$/s or more, 3 mm$^2$/s or more, or 6 mm$^2$/s or more, and may be 30 mm$^2$/s or less, 20 mm$^2$/s or less, or 10 mm$^2$/s or less. In the present specification, the kinematic viscosity at 40° C. and the kinematic viscosity at 100° C. refer to kinematic viscosities at 40° C. and 100° C., respectively, measured in accordance with JIS K 2283:2000.

The viscosity index of the first base oil may be, for example, 50 or more, 60 or more, or 80 or more, and may be 120 or less, 100 or less, or 90 or less. In the present specification, the viscosity index means a viscosity index measured according to JIS K2283:2000.

Such first base oils may be, for example, polyolesters or polyvinyl ethers. The polyol ester may be, for example, an ester of a polyhydric alcohol and a fatty acid. The polyol ester may be a partial ester in which some of the hydroxyl groups of the polyhydric alcohol are not esterified and remain as hydroxyl groups, a complete ester in which all of the hydroxyl groups are esterified, or a mixture of a partial ester and a complete ester.

The polyhydric alcohol may be, for example, a polyhydric alcohol having 2 to 6 hydroxyl groups. The number of carbon atoms of the polyhydric alcohol may be, for example, 4 to 12 or 5 to 10. The polyhydric alcohol may be, for example, a hindered alcohol such as neopentyl glycol, trimethylolethane, trimethylolpropane, trimethylolbutane, di-(trimethylolpropane), tri-(trimethylolpropane), pentaerythritol, or dipentaerythritol, and is preferably pentaerythritol or a mixed alcohol of pentaerythritol and dipentaerythritol, because of particularly excellent compatibility with the refrigerant.

The fatty acid may be, for example, a saturated fatty acid. The carbon number of the fatty acid may be, for example, 4 to 24, 4 to 12, 4 to 9, or 5 to 9. The fatty acids may be linear or branched. The proportion of the branched fatty acid in the fatty acid is preferably 20 to 100% by mole, more preferably 50 to 100% by mole, still more preferably 70 to 100% by mole, particularly preferably 90 to 100% by mole. The proportion of the branched fatty acid having 4 to 9 carbon atoms is particularly preferably within the above range.

Specific examples of the branched fatty acid having 4 to 9 carbon atoms include branched butanoic acid, branched pentanoic acid, branched hexanoic acid, branched heptanoic acid, branched octanoic acid, and branched nonanoic acid. The branched fatty acid having 4 to 9 carbon atoms is preferably a fatty acid having a branch at the α-position and/or the β-position. Such fatty acids may be, for example, isobutanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid and the like, preferably 2-ethylhexanoic acid and/or 3,5,5-trimethylhexanoic acid.

Examples of the polyvinyl ether include (co)polymers of any one or two or more monomers selected from vinyl ethers having an alkyl group having 1 to 8 carbon atoms, such as methyl vinyl ether, ethyl vinyl ether, isopropyl vinyl ether, and butyl vinyl ether. Preferred examples of the polyvinyl ether include polyvinyl ethers having a number average molecular weight (Mn) of 300 to 3000, an Mn/Mw of 1 to 1.5, and a kinematic viscosity at 40° C. of 30 to 100 mm$^2$/s.

The second base oil has a kinematic viscosity at 40° C. lower than the first base oil, and has a narrower compatibility region with the refrigerant than the first base oil. For example, when the two layer separation curve of the first base oil has a shape like C1 in FIG. 2, the second base oil has the two layer separation curve which is shifted upward from C1 or which has a shape like C2, and has a narrower compatible region than the first base oil in the range of a temperature of 30° C. and an oil ratio of 1 to 80% by mass. In addition, for example, when the two layer separation curve of the first base oil has a shape like C2 in FIG. 2, the second base oil has the two layer separation curve which has a shape shifted outward from C2, and has a narrower compatible region than the first base oil in the range of a temperature of 30° C. and an oil ratio of 1 to 80% by mass. By using such a second base oil, the compatible region of the mixed base oil of the first base oil and the second base oil becomes narrow than the compatible region of the first base oil. That is, the second base oil may be selected such that the compatible region when mixed with the first base oil is narrower than the first base oil.

The second base oil preferably does not have a compatible region $R_C$ that is compatible with the refrigerant at 30° C. or lower and an oil ratio of 10 to 40% by mass (has only a separation region $R_S$ that separates from the refrigerant) from the viewpoint of further suppressing a decrease in the refrigerant-dissolved viscosity of the refrigerating machine oil at high temperature and high pressure. The second base oil is desirably a base oil that does not have a low-temperature-side two layer separation curve having an upwardly convex shape with respect to the R410A refrigerant, and is particularly desirably a base oil that does not have a compatible region that is compatible with the R410A refrigerant at 30° C. or lower and an oil ratio of 10 to 40% by mass.

The kinematic viscosity at 40° C. of the second base oil is lower than the kinematic viscosity at 40° C. of the first base oil from the viewpoint of suitably decreasing the viscosity of the refrigerating machine oil. The difference between the kinematic viscosity at 40° C. of the first base oil and the kinematic viscosity at 40° C. of the second base oil (=kinematic viscosity at 40° C. of the first base oil–kinematic viscosity at 40° C. of the second base oil) may be preferably 10 mm$^2$/s or more, preferably 20 mm$^2$/s or more, more preferably 30 mm$^2$/s or more or 40 mm$^2$/s or more, and may be 60 mm$^2$/s or less or 50 mm$^2$/s or less. The ratio of the kinematic viscosity at 40° C. of the first base oil to the kinematic viscosity at 40° C. of the second base oil (=kinematic viscosity at 40° C. (mm$^2$/s) of the second base oil/kinematic viscosity at 40° C. (mm$^2$/s) of the first base oil="KV 40 ratio") is preferably 0.95 or less, 0.9 or less, 0.85 or less, 0.8 or less, 0.75 or less, 0.7 or less, 0.6 or less, or 0.5 or less, preferably 0.1 or more, 0.2 or more, 0.25 or more, or 0.35 or more.

More specifically, the kinematic viscosity at 40° C. of the second base oil may preferably be 60 mm$^2$/s or less, 50 mm$^2$/s or less, 40 mm$^2$/s or less, or 30 mm$^2$/s or less. The kinematic viscosity at 40° C. of the second base oil may be, for example, 5 mm$^2$/s or more, 10 mm$^2$/s or more, 15 mm$^2$/s or more, or 20 mm$^2$/s or more.

The kinematic viscosity at 100° C. of the second base oil may be lower than the kinematic viscosity at 100° C. of the first base oil, and preferably 20 mm$^2$/s or less, 15 mm$^2$/s or less, or 10 mm$^2$/s or less, from the viewpoint of further suitably decreasing the viscosity of the refrigerating machine oil. The kinematic viscosity at 100° C. of the second base oil may be, for example, 1 mm$^2$/s or more, 2 mm$^2$/s or more, or 4 mm$^2$/s or more.

The viscosity index of the second base oil may be, for example, −30 or more, and may be 250 or less. When the second base oil is a mineral or synthetic hydrocarbon oil, the viscosity index of the second base oil may be −30 or more, 0 or more, 30 or more, 60 or more, 90 or more, or 120 or more, and may be 180 or less, or 160 or less. When the second base oil is an oxygen-containing synthetic oil, the viscosity index of the second base oil may be 80 or more, 90 or more, 120 or more, 150 or more, or 180 or more, and may be 250 or less, 230 or less, or 220 or less. The ratio of the viscosity index of the second base oil to the viscosity index of the first base oil (=viscosity index of the second base oil/viscosity index of the first base oil="VI ratio") is preferably 0.9 or more, 1 or more, 1.2 or more, 1.5 or more, 1.8 or more, or 2 or more, and preferably 4 or less, 3.5 or less, 3 or less, or 2.5 or less.

The viscosity index of the refrigerating machine oil containing the first base oil and the second base oil is preferably higher than the viscosity index of the first base oil from the viewpoint of increasing the reduction rate of the kinematic viscosity of the refrigerating machine oil at a low temperature. The improvement range of the viscosity index (the viscosity index of the refrigerating machine oil−the viscosity index of the first base oil) is preferably 1 or more, 4 or more, or 8 or more.

In the refrigerating machine oil according to the present embodiment, it is desirable to select a combination of the first base oil and the second base oil so that the first base oil and the second base oil satisfy one or both of the above-described "KV 40 ratio" of 0.8 or less and the above-described "VI ratio" of 0.9 or more.

The flashpoint of the second base oil is preferably 150° C. or higher, more preferably 200° C. or higher, and even more preferably 250° C. or higher, and may be 300° C. or lower, or 280° C. or lower. In the present specification, the flash point means a flash point measured according to JIS K2265-4:2007 (Cleveland Open Cup (COC) method).

The pour point of the second base oils may be, for example, −20° C. or less, −30° C. or less, or −40° C. or less. In the present specification, the pour point means a pour point measured in accordance with JIS K2269:1987.

The second base oil is not particularly limited as long as the above-described conditions are satisfied, and may be, for example, at least 1 selected from the group consisting of mineral oils and synthetic oils exemplified below.

The mineral oil is obtained by refining a lubricating oil fraction obtained by atmospheric distillation and vacuum distillation of a crude oil such as a paraffinic or naphthenic oil by a method such as solvent deasphalting, solvent refining, hydrorefining, hydrocracking, solvent dewaxing, hydrodewaxing, clay treatment or sulfuric acid washing. These purification methods may be used singly or in appropriate combination of two or more. The mineral oil may be at least one selected from the group consisting of Gr I base oil, Gr II base oil, Gr III base oil and Gr III+ base oil.

As the synthetic oil, for example, a synthetic hydrocarbon oil such as a poly-α-olefin based base oil and a linear or branched alkylbenzene, and an oxygen-containing oil such as an ester, a polyvinyl ether, a polyalkylene glycol, a carbonate, a ketone, a polyphenyl ether, a silicone, a polysiloxane, or a perfluoroether can be used, and the oxygen-containing oil is preferably used.

Examples of the ester include an aromatic ester, a dibasic acid ester, a polyol ester, a complex ester, a carbonate ester, and a mixture of two or more thereof. The ester is preferably a polyol ester.

The second base oil may be, for example, an ester of one or two or more selected from monohydric alcohols and polyhydric alcohols with one or two or more selected from monocarboxylic fatty acids and polycarboxylic fatty acids. Specific examples of the second base oil include polyolesters having a long-chain group and having a kinematic viscosity at 40° C. of 10 to 60 mm$^2$/s, such as esters of neopentyl glycol and fatty acids containing at least one selected from fatty acids having 10 to 24 carbon atoms, esters of trimethylolpropane and fatty acids containing at least one selected from fatty acids having 10 to 24 carbon atoms, and the like.

The second base oil is preferably, for example, a diol ester of neopentyl glycol and oleic acid, a triol ester of trimethylolpropane and oleic acid, and the like. These low-viscosity and long-chain group-containing polyolesters have a low kinematic viscosity and excellent compatibility with the first base oil, but have low compatibility with the R32 or R32 mixed refrigerant, typically R410A, and therefore tend to exhibit the maximum effect with a small amount of addition.

As described above, the refrigerating machine oil of the present embodiment contains the first base oil and the second base oil. The content of the first base oil is preferably 30% by mass or more, more preferably 50% by mass or more, still more preferably 70% by mass or more, particularly preferably 80% by mass or 85% by mass or more, and preferably 97% by mass or less, more preferably 93% by mass or less, based on the total amount of the base oil. The content of the second base oil is preferably 3% by mass or more, more preferably 7% by mass or more, and is preferably 70% by mass or less, more preferably 50% by mass or less, still more preferably 30% by mass or less, particularly preferably 20% by mass or less or 15% by mass or less, based on the total amount of the base oil. By setting the contents of the first base oil and the second base oil within the above ranges, it is possible to achieve a low viscosity at a low temperature and a high oil ratio while maintaining a high refrigerant dissolved viscosity of the refrigerating machine oil at a high temperature and a high pressure. As a result, it is possible to further improve the efficiency of the refrigerating machine while further suppressing a decrease in lubricity in the sliding portion.

The refrigerating machine oil may further contain a base oil other than the first base oil and the second base oil (i.e, contain three or more base oils in total). In the case where the refrigerating machine oil contains three or more base oils, any two base oils among the three or more base oils may satisfy the conditions described above for the first base oil and the second base oil. That is, among the three or more base oils contained in the refrigerating machine oil, when one base oil (base oil A) has a compatible region with the refrigerant at a temperature of 30° C. or lower and an oil ratio of 1 to 80% by mass, and another base oil (base oil B) other than the base oil A has a kinematic viscosity at 40° C.

lower than the base oil A and has a narrower compatible region with the refrigerant than the first base oil, the refrigerating machine oil contains the first base oil (base oil A) and the second base oil (base oil B).

The total content of the first base oil and the second base oil may be 50% by mass or more, 70% by mass or more, or 90% by mass or more, based on the total amount of the base oil.

The refrigerating machine oil may further contain an additive in addition to the base oil. Examples of the additives include acid scavengers, antioxidants, extreme pressure agents, oiliness agents, antifoaming agents, metal deactivators, anti-wear agents, viscosity index improvers, pour point depressants, and detergent-dispersants.

The content of the base oil may be 90% by mass or more, 95% by mass or more, or 98% by mass or more, based on the total amount of the refrigerating machine oil. The content of the additive may be 10% by mass or less, 5% by mass or less, or 2% by mass or less, based on the total amount of the refrigerating machine oil.

The refrigerating machine oil as described above contains the first base oil and the second base oil, and thus has, for example, a two layer separation curve such as the two layer separation curve C2 indicated by a broken line in FIG. 2 (has no an upwardly convex two layer separation curve). The refrigerating machine oil preferably has no compatible region $R_C$ compatible with the refrigerant (has only a separation region $R_S$ separated from the refrigerant) at a temperature of 30° C. or lower and an oil ratio of 10 to 40% by mass, and has a compatible region $R_C$ compatible with the refrigerant at a temperature of 30° C. or lower and an oil ratio of 1 to 5% by mass or 50 to 80% by mass.

In this refrigerating machine oil, the kinematic viscosity at −20° C. (low-temperature kinematic viscosity) is lower than the kinematic viscosity at −20° C. (low-temperature kinematic viscosity) of the first base oil. The kinematic viscosity of the refrigerating machine oil at −20° C. is, for example, preferably 15000 mm$^2$/s or less or 10000 mm$^2$/s or less, more preferably 8000 mm$^2$/s or less or 7000 mm$^2$/s or less, preferably 1000 mm$^2$/s or more, more preferably 3000 mm$^2$/s or more, and still more preferably 5000 mm$^2$/s or more. In the present specification, the kinematic viscosity at −20° C. means a kinematic viscosity at −20° C. measured in accordance with JIS K2283:2000.

In the refrigerating machine oil of the present embodiment, the kinematic viscosity reduction rate at −20° C. is significantly larger than the kinematic viscosity reduction rate at 40° C. By lowering the low-temperature kinematic viscosity, the retention of the oil in the evaporator or the evaporation pipe (at a low temperature and a low oil ratio) is suppressed, and as a result, the efficiency of the refrigerating machine is improved. Therefore, in this refrigerating machine, it is possible to improve the efficiency of the refrigerating machine while suppressing a decrease in lubricity in the sliding portion. Further, even under a low temperature such as in a cold district or in winter, the low-temperature startability is improved and the efficiency of the refrigerating machine is improved because the refrigerating machine oil has a low viscosity.

In the refrigerating machine 10, since such a refrigerating machine oil is filled in the refrigerant circulation system 6, a decrease in the refrigerant dissolved viscosity of the working fluid composition containing the refrigerant and the refrigerating machine oil is suppressed, and thus the oil film in the sliding portion is held, and as a result, a decrease in the lubricity in the sliding portion can be suppressed. More specifically, since the second base oil is a base oil having low compatibility, the change rate ($=(V2-V1)/V1\times100$) of the refrigerant dissolved viscosity V2 of the working fluid composition in the state of containing the second base oil to the refrigerant dissolved viscosity V1 of the working fluid composition in the state of containing no second base oil is suppressed to, for example, ±20%, ±15%, or ±10%.

The refrigerant dissolved viscosity of the working fluid composition at 80° C. and 3.4 MPa is preferably 2 mm$^2$/s or more, 2.5 mm$^2$/s or more, or 2.8 mm$^2$/s or more, and 4 mm$^2$/s or less, 3.5 mm$^2$/s or less, or 3.3 mm$^2$/s or less. The refrigerant dissolved viscosity (mm$^2$/s) of the working fluid composition at high temperature and high pressure is measured by placing 100 g of the refrigerating machine oil in a 200 ml pressure-resistant vessel containing a vibration viscometer, vacuum-degassing the vessel, adding the refrigerant to prepare the working fluid composition, and adjusting the pressure of the refrigerant and the temperature of the pressure-resistant vessel to a temperature of 80° C. and an absolute pressure of 3.4 MPa.

In addition, since the second base oil has a kinematic viscosity at 40° C. lower than the first base oil, the viscosity of the refrigerating machine oil is reduced, and as a result, the efficiency of the refrigerating machine 10 is improved. More specifically, the rate of change ($=(KV1-KV2)/KV1\times100$) of the kinematic viscosity KV2 at −20° C. of the refrigerating machine oil containing the second base oil to the kinematic viscosity KV1 at −20° C. of the refrigerating machine oil containing no second base oil decreases to, for example, about 5% to 90%, preferably 10% or more, 20% or more, 30% or more, or 40% or more.

The kinematic viscosity at 40° C. of the refrigerating machine oil may be, for example, 30 mm$^2$/s or more, 40 mm$^2$/s or more, or 55 mm$^2$/s or more, and may be 100 mm$^2$/s or less, 70 mm$^2$/s or less, or 60 mm$^2$/s or less. The kinematic viscosity at 100° C. of the refrigerating machine oil may be, for example, 2 mm$^2$/s or more, 3 mm$^2$/s or more, or 5 mm$^2$/s or more, and may be 15 mm$^2$/s or less, 10 mm$^2$/s or less, or 8 mm$^2$/s or less. The viscosity index of the refrigerating machine oil may be, for example, 80 or more, 90 or more, 95 or more, or 98 or more, and may be 160 or less, 130 or less, or 120 or less.

From the viewpoint of safety, the flash point of the refrigerating machine oil is preferably 130° C. or higher, more preferably 180° C. or higher, and even more preferably 200° C. or higher, and may be 300° C. or lower, or 280° C. or lower.

The pour point of the refrigerating machine oil may be, for example, −10° C. or lower, −20° C. or lower, or −60° C. or higher.

The acid value of the refrigerating machine oil may be, for example, 1.0 mgKOH/g or less, or 0.1 mgKOH/g or less. In the present specification, the acid value means an acid value measured in accordance with JIS K2501:2003.

The volume resistivity of the refrigerating machine oil may be, for example, $1.0\times10^9$ Ω·m or more, $1.0\times10^{10}$ Ω·m or more, or $1.0\times10^{11}$ Ω·m or more. In the present specification, the volume resistivity means a volume resistivity at 25° C. measured in accordance with JIS C2101:1999.

The moisture content of the refrigerating machine oil may be, for example, 200 ppm or less, 100 ppm or less, or 50 ppm or less, based on the total amount of the refrigerating machine oil.

The ash content of the refrigerating machine oil may be, for example, 100 ppm or less, or 50 ppm or less. In the present specification, the ash content means an ash content measured in accordance with JIS K2272:1998.

This refrigerating machine oil is produced by selecting the first base oil and the second base oil as described above and mixing the first base oil and the second base oil.

EXAMPLES

Hereinafter, the present invention will be described more specifically based on Examples, but the present invention is not limited to Examples.

As the first base oil, base oils 1A to 1E shown in Table 1 were used. The meanings of abbreviations in Table 1 are as follows.

PE: pentaerythritol
DiPE: dipentaerythritol
iC4 acid: 2-methylpropanoic acid
iC5 acid: 2-methylbutanoic acid
nC5 acid: n-pentanoic acid
iC6 acid: 2-methylpentanoic acid
iC8 acid: 2-ethylhexanoic acid
iC9 acid: 3,5,5-trimethylhexanoic acid

TABLE 1

| Type | | Kinematic viscosity (mm²/s) 40° C. | 100° C. | Viscosity index | Maximum point of two layer separtion curve Oil ratio (% by mass) | Two layer separation temperature (° C.) |
|---|---|---|---|---|---|---|
| 1A | Ester of PE and iC8 acid/iC9 acid (mass ratio 50/50) | 68.3 | 8.31 | 88 | 20 | 13 |
| 1B | Ester of PE and iC5 acid/iC9 acid (mass ratio 25/75) | 84.2 | 9.41 | 86 | 17.5 | −29 |
| 1C | Ester of DiPE and iC6 acid | 78.8 | 10.3 | 113 | 15 | −62 |
| 1D | Ester of PE and nC5 acid/iC9 acid (mass ratio 26/74) | 67.2 | 8.67 | 100 | 20 | −23 |
| 1E | Ester of PE and iC4 acid/iC9 acid (mass ratio 37/63) | 68.4 | 8.18 | 84 | 17.5 | −52 |

Each of these first base oils has a convex two layer separation curve having the maximum point at the oil ratio and the layer separation temperature (the two layer separation temperature on the low temperature side) shown in Table 1 with respect to R410A. That is, each of these first base oils has a compatible region compatible with R410A in the range of a temperature of 30° C. or lower and an oil ratio of 1 to 80% by mass. Among the first base oils, the base oil 1A is separated into two layers at 30° C. or lower and an oil ratio of 10 to 40% by mass with respect to R32, has no upwardly convex two layer separation curve and no compatible region, but has a compatible region compatible with R32 in the range of 30° C. or lower and an oil ratio of 1 to 5% by mass or 50 to 80% by mass as shown by a two layer separation curve C2 in FIG. 2. The base oils 1B, 1C, 1D and 1E each has a two layer separation curve having an upwardly convex shape with respect to R32, and the maximum points of the two layer separation temperatures were 15° C. (oil ratio: 20% by mass), −16° C. (oil ratio: 25% by mass), 18° C. (oil ratio: 20% by mass) and −15° C. (oil ratio: 20% by mass).

As the second base oil, base oils 2A to 2N shown in Table 2 were used. The meanings of abbreviations in Table 2 are as follows.

NPG: neopentyl glycol
TMP: trimethylolpropane
PE: pentaerythritol
DiPE: dipentaerythritol
iC5 acid: 2-methylbutanoic acid
nC5 acid: n-pentanoic acid
nC6 acid: n-hexanoic acid
nC7 acid: n-heptanoic acid
iC8 acid: 2-ethylhexanoic acid
iC9 acid: 3,5,5-trimethylhexanoic acid
C18=acid: oleic acid

TABLE 2

| | Type | Kinematic viscosity (mm²/s) 40° C. | 100° C. | Viscosity index |
|---|---|---|---|---|
| 2A | Ester of NPG and C18 = acid | 23.9 | 5.9 | 205 |
| 2B | Ester of TMP and C18 = acid | 48.9 | 9.8 | 190 |
| 2C | Ester of PE and nC7 acid | 21.9 | 4.7 | 135 |
| 2D | Ester of PE and iC8 acid | 45.3 | 6.3 | 81 |
| 2E | Branched alkylbenzene | 23.9 | 3.8 | −23 |
| 2F | Linear alkylbenzene | 24.5 | 4.3 | 58 |
| 2G | Wax isomerized oil (Gr III+) | 16.1 | 3.9 | 142 |
| 2H | Hydroisomerized mineral oil (Gr III) | 46.7 | 7.6 | 129 |
| 2I | Paraffinic mineral oil (Gr I) | 8.1 | 2.2 | 74 |
| 2J | Naftenic mineral oil (Gr I) | 8.7 | 2.2 | 31 |
| 2K | Ester of PE and nC5 acid/iC8 acid (mass ratio 25/75) | 34.1 | 5.4 | 91 |
| 2L | Ester of PE and nC6 acid/iC9 acid (mass ratio 50/50) | 40.5 | 6.6 | 115 |
| 2M | Ester of PE and iC5 acid/iC8 acid (mass ratio 25/75) | 36.4 | 5.6 | 87 |
| 2N | Ester of PE/DiPE (mass ratio 80/20) and nC5 acid/nC7 acid/iC9 acid (mass ratio 40/40/20) | 30.3 | 5.7 | 133 |

Each of these base oils of second has a relatively narrower compatibility region (lower refrigerant compatibility) than the first base oil with respect to R410A and R32, and has a maximum point at two layer separation temperature of 20° C. or higher and in the range of an oil ratio of 10 to 40% by mass, or has no maximum point of two layer separation temperature of 30° C. or lower in the range of an oil ratio of 10 to 40% by mass.

The first base oil and the second base oil were mixed at a mass ratio shown in Tables 3 to 8 to prepare each base oil. To each of these base oils, 0.1% by mass of 2,6-di-tert-butyl-p-cresol (antioxidant), 0.001% by mass of 1,2,3-benzotriazole (metal deactivator), and 0.5% by mass of glycidyl neodecanoate (acid scavenger), based on the total amount of the refrigerating machine oil were added to prepare each refrigerating machine oil. The properties of the refrigerating machine oils are shown in Tables 3 to 8. In the tables, the low-temperature kinematic viscosity reduction rate (−20° C.) means a change rate (=(KV1−KV2)/KV1×100) of the kinematic viscosity KV2 at −20° C. of the refrigerating machine oil in the state containing the second base oil (Example) to the kinematic viscosity KV1 at −20° C. of the refrigerating machine oil in the state containing no second base oil (Comparative Example). In the tables, the kinematic viscosity reduction rate (40° C.) is a value calculated in the same manner as the low temperature kinematic viscosity reduction rate (−20° C.) based on the kinematic viscosity of the refrigerating machine oil at 40° C.

TABLE 3

|  |  |  | Comparative Example 1-1 | Example 1-1 | Example 1-2 | Example 1-3 | Example 1-4 |
|---|---|---|---|---|---|---|---|
| Composition of base oil (% by mass) | First base oil | 1A | 100 | 95 | 90 | 80 | 50 |
|  | Second base oil | 2A | — | 5 | 10 | 20 | 50 |
|  |  | 2B | — | — | — | — | — |
|  |  | 2C | — | — | — | — | — |
|  |  | 2D | — | — | — | — | — |
| Characteristics of refrigerating machine oil | Kinematic viscosity ($mm^2/s$) | 40° C. | 68.3 | 61.7 | 55.4 | 47.7 | 32.7 |
|  |  | 100° C. | 8.3 | 8.0 | 7.7 | 7.3 | 6.4 |
|  | Kinematic viscosity reduction rate (%) | 40° C. | Control | 9.7 | 18.9 | 30.2 | 52.1 |
|  | Viscosity index |  | 88 | 95 | 101 | 113 | 149 |
|  | Low temperature kinematic viscosity ($mm^2/s$) | −10° C. | 3419 | 2695 | 2101 | 1385 | 576.7 |
|  |  | −20° C. | 12500 | 8307 | 6592 | 3989 | 1390 |
|  | Low temperature kinematic viscosity reduction rate (%) | −20° C. | Control | 33.5 | 47.3 | 68.1 | 88.9 |
|  | Refrigerant dissolved viscosity ($mm^2/s$) R410A, 80° C., 3.4 MPa |  | 3.0 | 3.0 | 3.0 | 3.1 | 3.2 |

|  |  |  | Example 1-5 | Example 1-6 | Example 1-7 | Example 1-8 |
|---|---|---|---|---|---|---|
| Composition of base oil (% by mass) | First base oil | 1A | 80 | 90 | 80 | 80 |
|  | Second base oil | 2A | — | — | — | — |
|  |  | 2B | 20 | — | — | — |
|  |  | 2C | — | 10 | 20 | — |
|  |  | 2D | — | — | — | 20 |
| Characteristics of refrigerating machine oil | Kinematic viscosity ($mm^2/s$) | 40° C. | 63.7 | 60.0 | 53.0 | 62.7 |
|  |  | 100° C. | 8.6 | 7.8 | 7.3 | 7.8 |
|  | Kinematic viscosity reduction rate (%) | 40° C. | 6.7 | 12.1 | 22.5 | 8.2 |
|  | Viscosity index |  | 106 | 93 | 97 | 87 |
|  | Low temperature kinematic viscosity ($mm^2/s$) | −10° C. | 2400 | 2620 | 2010 | 3030 |
|  |  | −20° C. | 7810 | 9070 | 6630 | 10940 |
|  | Low temperature kinematic viscosity reduction rate (%) | −20° C. | 37.5 | 27.4 | 47.0 | 12.5 |
|  | Refrigerant dissolved viscosity ($mm^2/s$) R410A, 80° C., 3.4 MPa |  | 3.1 | 3.0 | 3.1 | 3.1 |

TABLE 4

|  |  |  | Example 1-9 | Example 1-10 | Example 1-11 | Example 1-12 | Example 1-13 | Example 1-14 |
|---|---|---|---|---|---|---|---|---|
| Composition of base oil (% by mass) | First base oil | 1A | 90 | 90 | 90 | 90 | 90 | 90 |
|  | Second base oil | 2E | 10 | — | — | — | — | — |
|  |  | 2F | — | 10 | — | — | — | — |
|  |  | 2G | — | — | 10 | — | — | — |
|  |  | 2H | — | — | — | 10 | — | — |
|  |  | 2I | — | — | — | — | 10 | — |
|  |  | 2J | — | — | — | — | — | 10 |
| Characteristics of refrigerating machine oil | Kinematic viscosity ($mm^2/s$) | 40° C. | 60.7 | 60.9 | 57.6 | 65.7 | 51.7 | 52.4 |
|  |  | 100° C. | 7.6 | 7.7 | 7.6 | 8.2 | 7.0 | 7.0 |
|  | Kinematic viscosity reduction rate (%) | 40° C. | 11.1 | 10.9 | 15.7 | 3.9 | 24.3 | 23.3 |
|  | Viscosity index |  | 84 | 88 | 94 | 92 | 90 | 87 |
|  | Low temperature kinematic viscosity ($mm^2/s$) | −10° C. | 2980 | 2860 | 2420 | 3060 | 2120 | 2250 |
|  |  | −20° C. | 10870 | 10220 | 8280 | 10820 | 7270 | 7830 |
|  | Low temperature kinematic viscosity reduction rate (%) | −20° C. | 13.0 | 18.2 | 33.8 | 13.4 | 41.8 | 37.4 |
|  | Refrigerant dissolved viscosity ($mm^2/s$) R410A, 80° C., 3.4 MPa |  | ≥3.0 | ≥3.0 | ≥3.0 | ≥3.0 | ≥3.0 | ≥3.0 |

TABLE 5

|  |  |  | Comparative Example 2-1 | Example 2-1 |
|---|---|---|---|---|
| Composition of base oil (% by mass) | First base oil | 1B | 100 | 90 |
|  | Second base oil | 2A | — | 10 |
| Characteristics of refrigerating machine oil | Kinematic viscosity (mm$^2$/s) | 40° C. | 84.2 | 72.88 |
|  |  | 100° C. | 9.41 | 8.95 |
|  | Kinematic viscosity reduction rate (%) | 40° C. | Control | 13.4 |
|  | Viscosity index |  | 86 | 95 |
|  | Low temperature kinematic viscosity (mm$^2$/s) | −10° C. | 4,980 | 3,430 |
|  |  | −20° C. | 19,110 | 12,110 |
|  | Low temperature kinematic viscosity reduction rate (%) | −20° C. | Control | 31.1 |
|  | Refrigerant dissolved viscosity (mm$^2$/s) R410A, 80° C., 3.4 MPa |  | Control | Equal to Control |

TABLE 6

|  |  |  | Comparative Example 3-1 | Example 3-1 | 3-2 | 3-3 | 3-4 | 3-5 |
|---|---|---|---|---|---|---|---|---|
| Composition of base oil (% by mass) | First base oil | 1C | 100 | 90 | 90 | 90 | 90 | 90 |
|  | Second base oil | 2A | — | 10 | — | — | — | — |
|  |  | 2K | — | — | 10 | — | — | — |
|  |  | 2L | — | — | — | 10 | — | — |
|  |  | 2M | — | — | — | — | 10 | — |
|  |  | 2N | — | — | — | — | — | 10 |
| Characteristics of refrigerating machine oil | Kinematic viscosity (mm$^2$/s) | 40° C. | 78.8 | 68.79 | 71.91 | 73.37 | 72.47 | 70.88 |
|  |  | 100° C. | 10.3 | 9.69 | 9.60 | 9.82 | 9.63 | 9.66 |
|  | Kinematic viscosity reduction rate (%) | 40° C. | Control | 12.7 | 8.7 | 6.9 | 8.0 | 10.0 |
|  | Viscosity index |  | 113 | 121 | 112 | 114 | 112 | 116 |
|  | Low temperature kinematic viscosity (mm$^2$/s) | −10° C. | 2,910 | 2,160 | 2,610 | 2,620 | 2,660 | 2,430 |
|  |  | −20° C. | 9,290 | 6,510 | 8,310 | 8,260 | 8,480 | 7,570 |
|  | Low temperature kinematic viscosity reduction rate (%) | −20° C. | Control | 25.8 | 10.3 | 10.0 | 8.6 | 16.5 |
|  | Refrigerant dissolved viscosity (mm$^2$/s) R410A, 80° C., 3.4 MPa |  | Control | Equal to Control | Equal to Control | Equal to Control | Equal to Control | Equal to Control |

TABLE 7

|  |  |  | Comparative Example 4-1 | Example 4-1 |
|---|---|---|---|---|
| Composition of base oil (% by mass) | First base oil | 1D | 100 | 90 |
|  | Second base oil | 2A | — | 10 |
| Characteristics of refrigerating machine oil | Kinematic viscosity (mm$^2$/s) | 40° C. | 67.2 | 59.84 |
|  |  | 100° C. | 8.67 | 8.32 |
|  | Kinematic viscosity reduction rate (%) | 40° C. | Control | 11.0 |
|  | Viscosity index |  | 100 | 109 |
|  | Low temperature kinematic viscosity (mm$^2$/s) | −10° C. | 2,810 | 2,100 |
|  |  | −20° C. | 9,520 | 6,650 |
|  | Low temperature kinematic viscosity reduction rate (%) | −20° C. | Control | 25.3 |
|  | Refrigerant dissolved viscosity (mm$^2$/s) R410A, 80° C., 3.4 MPa |  | Control | Equal to Control |

TABLE 8

|  |  |  | Comparative Example 5-1 | Example 5-1 | 5-2 | 5-3 |
|---|---|---|---|---|---|---|
| Composition of base oil (% by mass) | First base oil | 1E | 100 | 90 | — | — |
|  | Second base oil | 2A | — | 10 | — | — |
|  |  | 2M | — | — | 10 | — |
|  |  | 2N | — | — | — | 10 |

TABLE 8-continued

| | | | Comparative Example 5-1 | Example 5-1 | 5-2 | 5-3 |
|---|---|---|---|---|---|---|
| Characteristics of refrigerating machine oil | Kinematic viscosity (mm²/s) | 40° C. | 68.4 | 60.78 | 63.94 | 62.58 |
| | | 100° C. | 8.18 | 7.90 | 7.86 | 7.88 |
| | Kinematic viscosity reduction rate (%) | 40° C. | Control | 11.1 | 6.5 | 8.5 |
| | Viscosity index | | 84 | 94 | 85 | 89 |
| | Low temperature kinematic viscosity (mm²/s) | −10° C. | 3,650 | 2,620 | 3,240 | 2,960 |
| | | −20° C. | 13,630 | 9,060 | 11,910 | 10,600 |
| | Low temperature kinematic viscosity reduction rate (%) | −20° C. | Control | 28.2 | 11.2 | 18.9 |
| | Refrigerant dissolved viscosity (mm²/s) R410A, 80° C., 3.4 MPa | | Control | Equal to Control | Equal to Control | Equal to Control |

In Examples 1-1 to 1-4, the second base oil is compatible with the first base oil. In the case where the second base oil is blended in the first base oil, a two layer separation curve like C2 of FIG. 2 is shown (there is no upwardly convex two layer separation curve), and a compatible region compatible with the R410A refrigerant or the R32 refrigerant is present in the range of the temperature of 30° C. or lower and the oil ratio of 1 to 5% by mass or 50 to 80% by mass. The working fluid composition obtained by mixing the refrigerating machine oil of Examples 1 to 4 containing the first base oil and the second base oil with the R410A or R32 refrigerant has no compatible region in the range of the temperature of 30° C. or lower and the oil ratio of 10 to 40% by mass as indicated by the two layer separation curve C2 in FIG. 2, and thus returns to the compressor while maintaining the refrigerant dissolved viscosity. As a result, lubricity is maintained.

In addition, the refrigerating machine oils of Examples 1-1 to 1-4 have a compatible region in the range of the temperature of 30° C. or less and the oil ratio of 5% by mass or less or 50 to 80% by mass. For example, the refrigerating machine oils of Examples 1 to 4 have a compatible region compatible with R410A in the range of the oil ratio of 40 to 80% by mass, 46 to 80% by mass, 50 to 80% by mass, and 60 to 80% by mass, respectively. In the region where the oil ratio is high, since the refrigerant dissolved viscosity of the refrigerating machine oil is high and the refrigerant compatibility is good, the oil returnability is good and the lubricity of the sliding portion of the compressor is also maintained. In addition, even in the case of a low temperature and a high oil rate, the efficiency of the refrigerator is enhanced by suppressing the accumulation of oil in the evaporator or the evaporation tubes. Furthermore, in the region of the oil ratio of 1 to 5% by mass, since the refrigerant ratio is high and the refrigerant and the refrigerating machine oil are appropriately mixed, the oil returnability is also improved.

In Examples 1-1 to 1-4 in which such a refrigerating machine oil was used, as compared with Comparative Example 1 in which a refrigerating machine oil containing only a first base oil was used, a decrease in the refrigerant dissolved viscosity was suppressed (a refrigerating machine oil having a refrigerant dissolved viscosity equal to or higher than Comparative Example 1 was obtained), and the refrigerating machine oil had a reduced viscosity (particularly, a reduced low temperature kinematic viscosity). Similarly, in Examples 1-5 to 1-14, 2-1, 3-1 to 3-5, 4-1, and 5-1 to 5-3, as compared with Comparative Examples using a refrigerating machine oil containing only the first base oil, a decrease in the refrigerant dissolved viscosity is suppressed (a refrigerating machine oil having a refrigerant dissolved viscosity equal to or higher than Comparative Examples is obtained), and the refrigerating machine oil has a reduced viscosity (particularly, a reduced low temperature kinematic viscosity). Therefore, by using the refrigerating machine oil containing the first base oil and the second base oil, the viscosity can be reduced at a low temperature, and the retention of the oil in the evaporator or the evaporation tubes (which has a low temperature and a low oil ratio) is suppressed, and as a result, the efficiency of the refrigerating machine is improved. Therefore, in this refrigerating machine, it is possible to improve the efficiency of the refrigerating machine while suppressing a decrease in lubricity in the sliding portion. Further, since the refrigerating machine oil has a low viscosity under a low temperature such as in a cold district or in winter, the low-temperature startability is improved and the efficiency of the refrigerating machine is improved.

REFERENCE SIGNS LIST

1: compressor, 2: condenser, 3: expansion mechanism, 4: evaporator, 5: flow path, 6: refrigerant circulation system, 10: refrigerating machine.

The invention claimed is:

1. A refrigerating machine comprising a refrigerant circulation system comprising a compressor, a condenser, an expansion mechanism, and an evaporator, and the refrigerant circulation system being filled with a refrigerant and a refrigerating machine oil, wherein
the refrigerating machine oil comprises:
a first base oil having a compatible region with the refrigerant in a range of a temperature of 30° C. or lower and an oil ratio of 1 to 80% by mass; and
a second base oil having a kinematic viscosity at 40° C. lower than the first base oil and having a narrower compatible region with the refrigerant than the first base oil,
wherein the combination of the first base oil and the second base oil is not a combination of a polyol ester and a complex ester, and
wherein a ratio of kinematic viscosity at 40° C. (mm²/s) of the second base oil/kinematic viscosity at 40° C. (mm²/s) of the first base oil is 0.95 or less.

2. The refrigerating machine according to claim 1, wherein the first base oil has a compatible region with the refrigerant in a range of a temperature of 30° C. or lower and an oil ratio of 1 to 5% by mass or 50 to 80% by mass.

3. The refrigerating machine according to claim 1, wherein the second base oil has no compatible region with the refrigerant in a range of 30° C. or lower and an oil ratio of 10 to 40% by mass.

4. The refrigerating machine according to claim 1, wherein the refrigerating machine oil has no compatible region with the refrigerant in a range of a temperature of 30° C. or lower and an oil ratio of 10 to 40% by mass, and has a compatible region with the refrigerant in a range of a temperature of 30° C. or lower and an oil ratio of 1 to 5% by mass or 50 to 80% by mass, and
a kinematic viscosity at −20° C. of the refrigerating machine oil is lower than a kinematic viscosity at −20° C. of the first base oil.

5. The refrigerating machine according to claim 1, wherein the refrigerant comprises difluoromethane.

6. The refrigerating machine according to claim 1, wherein the second base oil has a kinematic viscosity at 40° C. of 10 to 60 mm$^2$/s and a viscosity index of 120 or more.

7. The refrigerating machine according to claim 1, wherein a content of the second base oil is 3% by mass or more and 60% by mass or less based on the total amount of the base oil.

8. A refrigerating machine oil for use with a refrigerant, comprising:
a first base oil having a compatible region with the refrigerant in a region of a temperature of 30° C. or lower and an oil ratio of 1 to 80% by mass; and
a second base oil having a kinematic viscosity at 40° C. lower than the first base oil and having a narrower compatible region with the refrigerant than the first base oil,
wherein the combination of the first base oil and the second base oil is not a combination of a polyol ester and a complex ester, and
wherein a ratio of kinematic viscosity at 40° C. (mm$^2$/s) of the second base oil/kinematic viscosity at 40° C. (mm$^2$/s) of the first base oil is 0.95 or less.

9. A working fluid composition for a refrigerating machine comprising:
a refrigerating machine oil; and
a refrigerant, wherein
the refrigerating machine oil comprises:
a first base oil having a compatible region with the refrigerant in a range of a temperature of 30° C. or lower and an oil ratio of 1 to 80% by mass; and
a second base oil having a kinematic viscosity at 40° C. lower than the first base oil and having a narrower compatible region with the refrigerant than the first base oil,
wherein the combination of the first base oil and the second base oil is not a combination of a polyol ester and a complex ester, and
wherein a ratio of kinematic viscosity at 40° C. (mm$^2$/s) of the second base oil/kinematic viscosity at 40° C. (mm$^2$/s) of the first base oil is 0.95 or less.

10. A method of producing a refrigerating machine oil for use with a refrigerant, the method comprising selecting a first base oil and a second base oil, and mixing the first base oil and the second base oil, wherein the first base oil has a compatible region in a range of a temperature of 30° C. or lower and an oil ratio of 1 to 80% by mass, and
the second base oil has a kinematic viscosity at 40° C. lower than the first base oil and has a compatible region narrower than the first base oil,
wherein the combination of the first base oil and the second base oil is not a combination of a polyol ester and a complex ester, and
wherein a ratio of kinematic viscosity at 40° C. (mm$^2$/s) of the second base oil/kinematic viscosity at 40° C. (mm$^2$/s) of the first base oil is 0.95 or less.

11. The refrigerating machine according to claim 6, wherein the first base oil has a viscosity index of 100 or less.

12. The refrigerating machine according to claim 1, wherein
the first base oil is at least one selected from the group consisting of a polyolester and a polyvinyl ether, and
the second base oil is at least one selected from the group consisting of a mineral oil, a synthetic hydrocarbon oil, an ester, a polyvinyl ether, a polyalkylene glycol, a carbonate, a ketone, a polyphenyl ether, a silicone, a polysiloxane, and a perfluoroether.

13. The refrigerating machine according to claim 12, wherein the ester is at least one selected from the group consisting of an aromatic ester, a dibasic acid ester, a polyol ester, and a carbonate ester.

14. The refrigerating machine according to claim 1, wherein a rate of change of the kinematic viscosity at −20° C. of the refrigerating machine oil containing the second base oil to the kinematic viscosity at −20° C. of a refrigerating machine oil containing no second base oil is 5% to 90%.

15. The refrigerating machine oil according to claim 8, wherein the second base oil has a kinematic viscosity at 40° C. of 10 to 60 mm$^2$/s and a viscosity index of 120 or more.

16. The refrigerating machine oil according to claim 15, wherein the first base oil has a viscosity index of 100 or less.

17. The refrigerating machine oil according to claim 8, wherein
the first base oil is at least one selected from the group consisting of a polyolester and a polyvinyl ether, and
the second base oil is at least one selected from the group consisting of a mineral oil, a synthetic hydrocarbon oil, an ester, a polyvinyl ether, a polyalkylene glycol, a carbonate, a ketone, a polyphenyl ether, a silicone, a polysiloxane, and a perfluoroether.

18. The refrigerating machine oil according to claim 17, wherein the ester is at least one selected from the group consisting of an aromatic ester, a dibasic acid ester, a polyol ester, and a carbonate ester.

19. The refrigerating machine oil according to claim 8, wherein a rate of change of the kinematic viscosity at −20° C. of the refrigerating machine oil containing the second base oil to the kinematic viscosity at −20° C. of a refrigerating machine oil containing no second base oil is 5% to 90%.

* * * * *